United States Patent
Heller et al.

(10) Patent No.: US 7,349,827 B1
(45) Date of Patent: *Mar. 25, 2008

(54) SYSTEM AND METHOD FOR REPORTING WEBSITE ACTIVITY BASED ON INFERRED ATTRIBUTION METHODOLOGY

(75) Inventors: Jonathan Marc Heller, New York, NY (US); James Christopher Kim, New York, NY (US); Dwight Allen Merriman, New York, NY (US); Andrew Joel Erlichson, Metuchen, NJ (US); Benjamin Chien-wen Lee, Bayside, NY (US)

(73) Assignee: DoubleClick Inc., New York, NY (US)

( * ) Notice: Subject to any disclaimer, the term of this patent is extended or adjusted under 35 U.S.C. 154(b) by 796 days.

This patent is subject to a terminal disclaimer.

(21) Appl. No.: 10/245,579

(22) Filed: Sep. 18, 2002

(51) Int. Cl.
*G06F 11/30* (2006.01)

(52) U.S. Cl. ........................... 702/186; 702/124
(58) Field of Classification Search ........... 702/186, 702/124
See application file for complete search history.

(56) References Cited

U.S. PATENT DOCUMENTS

| | | | |
|---|---|---|---|
| 5,999,971 A * | 12/1999 | Buckland | 709/218 |
| 6,205,432 B1 * | 3/2001 | Gabbard et al. | 705/14 |
| 6,393,479 B1 * | 5/2002 | Glommen et al. | 709/224 |
| 6,633,850 B1 * | 10/2003 | Gabbard et al. | 705/14 |
| 6,792,458 B1 * | 9/2004 | Muret et al. | 709/224 |
| 6,904,408 B1 * | 6/2005 | McCarthy et al. | 705/2 |
| 6,925,442 B1 * | 8/2005 | Shapira et al. | 705/10 |
| 6,973,492 B2 * | 12/2005 | Streble | 709/224 |
| 6,976,056 B1 * | 12/2005 | Kumar | 709/206 |
| 7,085,682 B1 * | 8/2006 | Heller et al. | 702/186 |
| 7,260,774 B2 * | 8/2007 | Lambert et al. | 715/513 |
| 2001/0056366 A1 * | 12/2001 | Naismith | 705/10 |
| 2002/0087679 A1 * | 7/2002 | Pulley et al. | 709/224 |
| 2002/0116531 A1 * | 8/2002 | Chu | 709/246 |
| 2002/0143933 A1 * | 10/2002 | Hind et al. | 709/224 |
| 2002/0147772 A1 * | 10/2002 | Glommen et al. | 709/203 |

(Continued)

OTHER PUBLICATIONS

C. Bounsaythip, E. Rinta-Runsala, Overview of data mining for customer behavior modeling, Technical Report TTE1-2001-18, VTT Information Technology (Jun. 2001).*

(Continued)

*Primary Examiner*—Nasser Moazzami
*Assistant Examiner*—David Garcia Cervetti (57) ABSTRACT

A method and system for reporting website activity. According to an example embodiment, the system receives event-level data representing visitor activity through navigation entities on a client website, infers attribution of one or more metrics to at least one navigation entity based on the visitor activity, and provides online reports to the client based on the inferred attribution.

18 Claims, 8 Drawing Sheets

U.S. PATENT DOCUMENTS

| | | |
|---|---|---|
| 2002/0184364 A1* | 12/2002 | Brebner .................. 709/224 |
| 2002/0186237 A1* | 12/2002 | Bradley et al. ............. 345/736 |
| 2003/0046385 A1* | 3/2003 | Vincent .................. 709/224 |
| 2003/0107575 A1* | 6/2003 | Cardno .................. 345/440 |
| 2003/0154442 A1* | 8/2003 | Papierniak ............... 715/501.1 |
| 2003/0163563 A1* | 8/2003 | Bean .................... 709/224 |
| 2003/0163566 A1* | 8/2003 | Perkins et al. ............ 709/225 |
| 2004/0059746 A1* | 3/2004 | Error et al. .............. 707/102 |
| 2004/0098229 A1* | 5/2004 | Error et al. .............. 702/186 |
| 2004/0122943 A1* | 6/2004 | Error et al. .............. 709/224 |
| 2004/0205119 A1* | 10/2004 | Streble et al. ............. 709/203 |
| 2005/0021731 A1* | 1/2005 | Sehm et al. .............. 709/224 |
| 2006/0248452 A1* | 11/2006 | Lambert et al. ............ 715/513 |

OTHER PUBLICATIONS

J. Srivastava, P. Desikan, and V. Kumar, "Web Mining: Accomplishments and Future Directions," Proc. US Nat'l Science Foundation Workshop on Next-Generation Data Mining (NGDM), Nat'l Science Foundation, 2002.*

Mariano, Gwendolyn, Web Bugs Draw Interest of Online Traffic Auditors, Jan. 2001, CNET, <http://news.com.com/2100-1023-251706.html>.*

* cited by examiner

SYSTEM AND METHOD FOR REPORTING WEBSITE ACTIVITY BASED ON INFERRED ATTRIBUTION METHODOLOGY

CROSS-REFERENCE TO RELATED APPLICATION

This application is related to U.S. patent application entitled "System and Method for Analyzing Website Activity", filed Sep. 18, 2002, which is hereby incorporated by reference in its entirety.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

BACKGROUND OF THE INVENTION

The increase in electronic commerce over the Internet has resulted in a growing demand for websites to track their online customers' behavior and activity while at their sites. Tracking this activity enables the website to better understand their customers, which provides insight into ways in which the websites' service and/or offerings can be improved. Websites can track their information on their own, but larger sites enlist the aid of third party application software or a third party application service provider ("ASP") to do the work for them.

Client websites place great value on the ability of an ASP, for instance, to report on overall website metrics, such as revenue or cartings (i.e., the action of a visitor placing a product in a cart), and on what is driving the metrics on the client's website. Current ASP systems attribute overall website metrics to specific navigation entities, like hyperlinks, pages and sections (i.e., collections of pages pertaining to a specific grouping of products, like "sports equipment" or "laptop accessories"), which enables clients to gain an understanding of which navigation entities have significant impact on those metrics. However, in order for ASPs to break down the overall metrics according to navigation entity, the ASP requires knowledge of the mapping of the metrics to the navigation entities prior to attribution taking place.

To implement this attribution methodology, an ASP system may require, as an initial setup matter, a client web site map that details which navigation entity will receive attribution of which metric prior to the system being run. For example, if a client web site showcases a specific digital video disc ("DVD") on its home page, there may be an entry in the corresponding web site map specifying that revenue resulting from the purchase of that DVD be attributed to the home page, thereby crediting the home page for directing the visitor to the DVD purchase. When the ASP sees that a visitor bought the DVD, the ASP system consults the map and attributes the corresponding revenue to the home page.

A major drawback to this mapping process is that there is an up front effort required to initially map all relevant metrics to their corresponding navigation entities. Additionally, if the client web site makes any changes to a mapped navigation entity on its site, the map held in the ASP system must be updated to reflect those changes in order for the metrics to be properly attributed to the changed navigation entities. This increases the client's ongoing effort to maintain the ASP system.

Some ASPs may eliminate the need for the web site map by requiring attribution information to be provided on each relevant web page, and to be carried forward (e.g., via session variables or query strings in the uniform resource locator ("URL")) through a visitor's navigation path during a session. For example, if a client web site showcases a specific DVD on its home page, attribution information on the home page (such as "apply revenue to home page") may follow the visitor through to check out. Thus, if a visitor ends up buying the DVD, the ASP system will see the carried through attribution information when the visitor pays for the DVD, and know to attribute that revenue to the home page.

However, every time a change is made to a navigation entity under this approach, client effort is still required to change the attribution information that is held on that navigation entity and to be carried forward during a session.

Accordingly, there is a need in the art for a low-maintenance system and method for enabling attribution without additional client effort when a navigation entity is added, removed or changed.

SUMMARY OF THE INVENTION

The present invention is directed to a system and method for analyzing online customer activity at a website in a cost-effective and efficient manner. Efficient data collection, processing, attribution and report presentation processes enable client websites to quickly access and understand the interaction between site traffic and transactions, and those factors that drive each transaction.

According to an example embodiment, the system receives event-level data representing visitor activity through navigation entities on a client website, infers attribution of one or more metrics to at least one navigation entity based on the visitor activity, and provides online reports to the client based on the inferred attribution.

BRIEF DESCRIPTION OF THE DRAWINGS

FIG. 8 is a screen shot of an Shelf Space Analysis page in accordance with an embodiment of the present invention.

DETAILED DESCRIPTION

Overview

Figure 1:
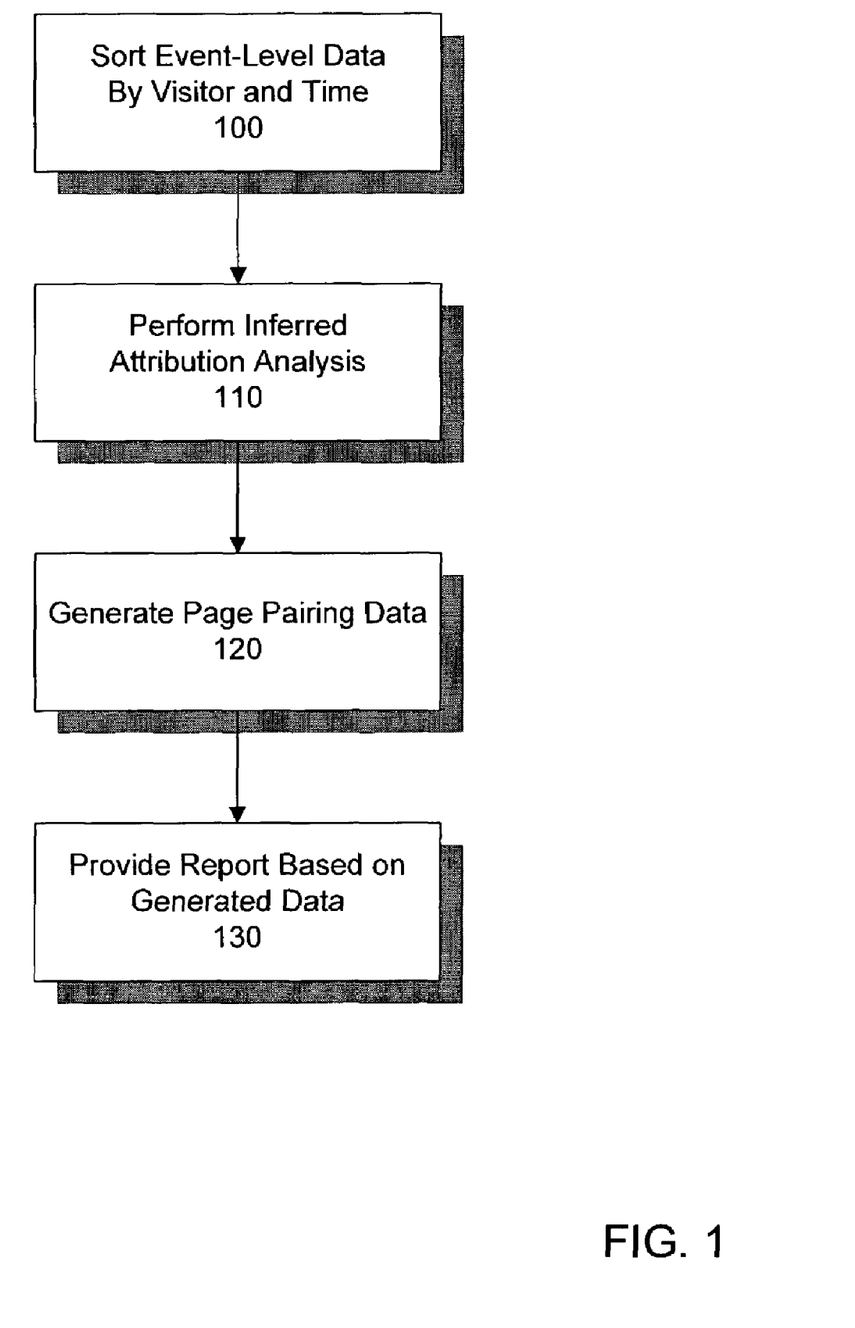
FIG. 1 is a block diagram that depicts a process for providing a report on website activity based on an inferred attribution methodology in accordance with an embodiment of the present invention.

FIG. 1 provides an overview of a process and system according to an embodiment of the present invention. The system receives event-level data, representing specific events that describe a customer's presence and/or activity through navigation entities at a client website, such as clicking on a specific web page or buying a specific product. Upon receipt of the event-level data, the system sorts the event-level data by visitor and time received (step 100), in order to group the activity by visitor sessions. The system next performs an inferred attribution analysis (step 110) on the event-level data, which attributes metrics, such as revenue or cartings, to at least one navigation entity based on the visitor activity and not explicit attribution information from the event-level data. The system then generates page-pairing data (step 120) to be used in providing a report to the client (step 130).

Architecture

Figure 2:
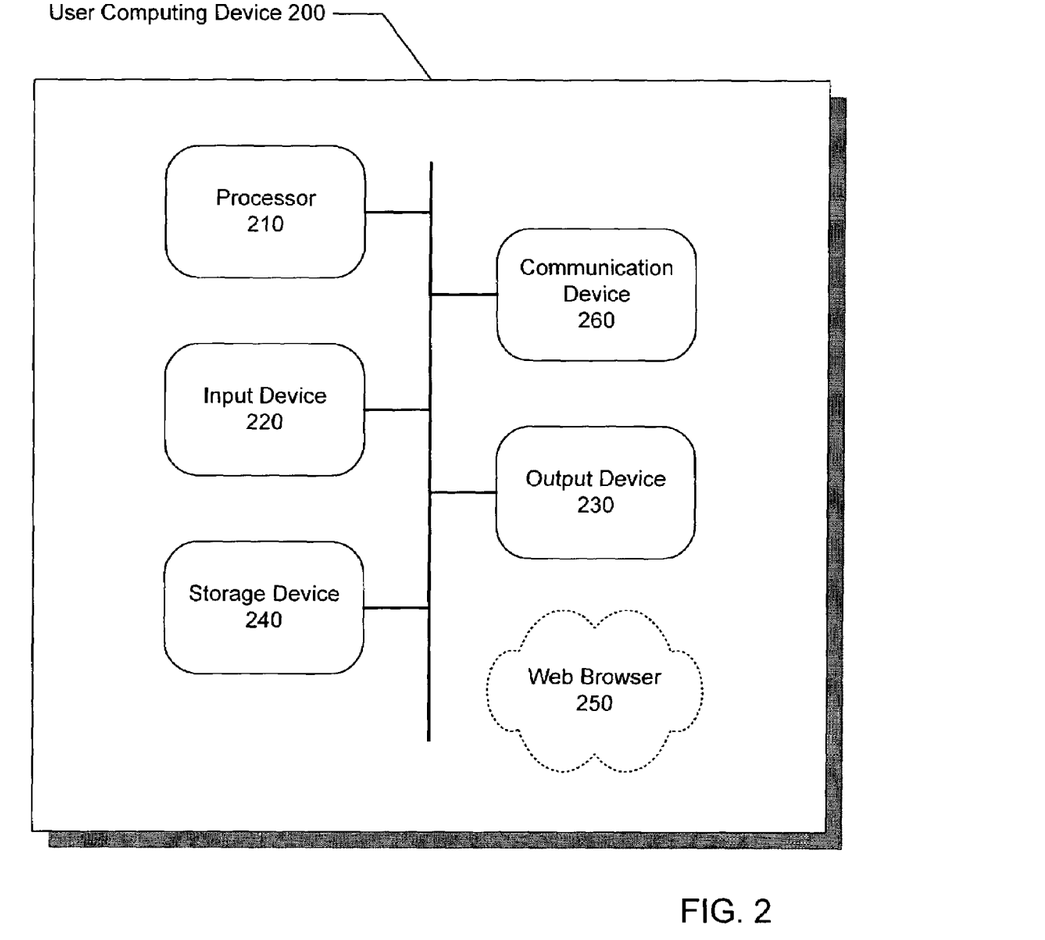
FIG. 2 is a block diagram that depicts a user computing device in accordance with an embodiment of the present invention.

FIG. 2 is a block diagram depicting the internal structure of user computing device 200 in accordance with an embodiment of the present invention. User computing device 200 may be a personal computer, handheld personal digital assistant ("PDA"), or any other type of microprocessor-based device. User computing device 200 may include a processor 210, input device 220, output device 230, storage device 240, web browser 250, and communication device 260.

Input device 220 may include a keyboard, mouse, pen-operated touch screen, voice-recognition device, or any other device that provides input from a user. Output device 230 may include a monitor, printer, disk drive, speakers, or any other device that provides tangible output to user.

Storage device 240 may include volatile and nonvolatile data storage. Volatile data storage includes random-access memory ("RAM"), a cache, or any storage medium that temporarily holds data while being processed; nonvolatile data storage includes a hard drive, compact disc read-only memory ("CD-ROM") drive, tape drive, removable storage disk, or any other non-temporary storage medium. Communication device 260 may include a modem, network interface card, or any other device capable of transmitting and receiving signals over a network.

Web browser 250, which may be stored in storage device 240 and executed by processor 210, may include the INTERNET EXPLORER® web browser by Microsoft Corp. or the COMMUNICATOR® web browser by Netscape Communications Corp., or any other software program that displays data from a web server to a user via output device 230. One skilled in the art would appreciate that the components of user computing device 200 may also be connected wirelessly, possibly through an infrared connection.

Figure 3:
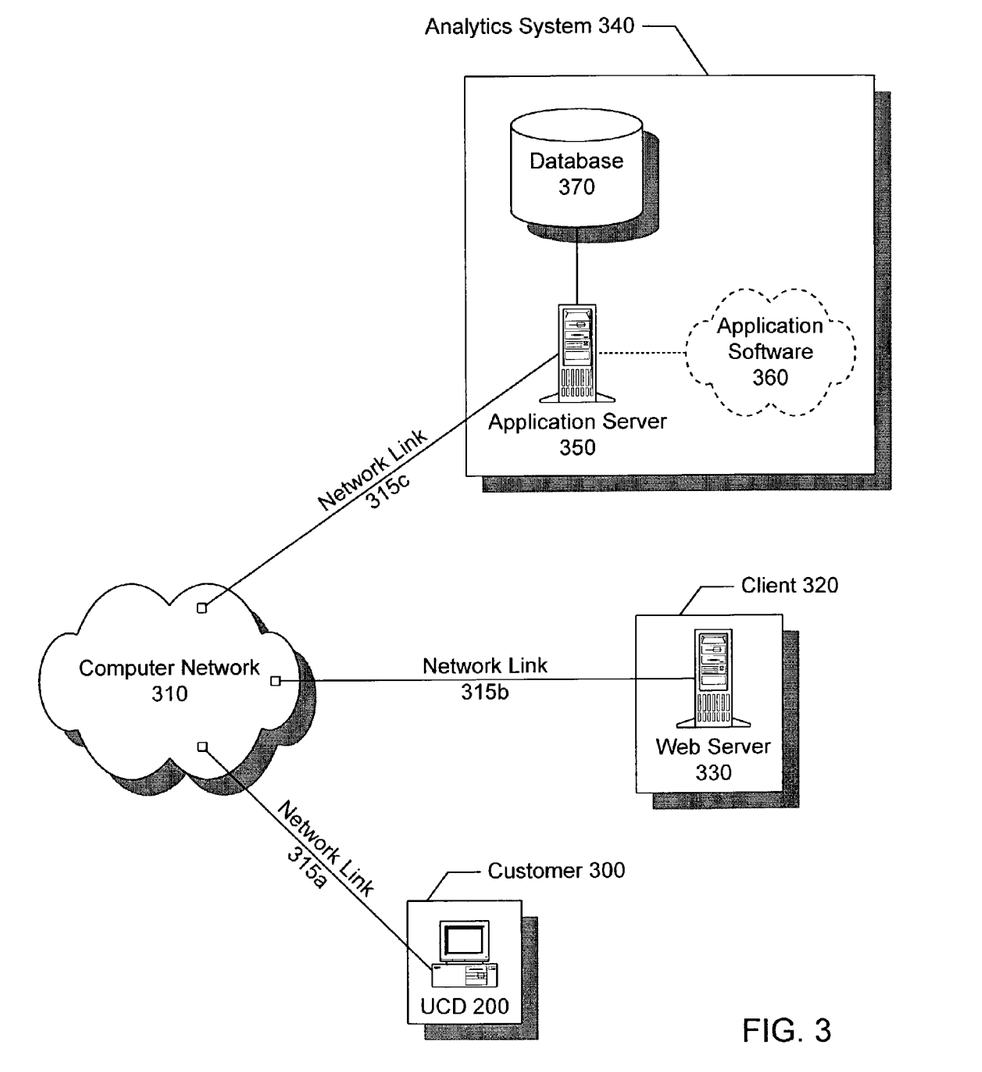
FIG. 3 is a block diagram that depicts a network architecture for an analysis system in accordance with an embodiment of the present invention.

FIG. 3 is a block diagram depicting a network architecture for an analysis system in accordance with an embodiment of the present invention. According to one particular embodiment, when customer 300 visits the website of client 320, user computing device 200 sends and receives via web browser 250 HTTP ("Hypertext Transport Protocol") requests (or any similar protocol requests) to and from web server 330 via network link 315a, computer network 310, and network link 315b. As customer 300 proceeds through client 320's website, web server 330 sends information about customer 300's online activity to application server 350 of analytics system 340 (via network link 315b, computer network 310 and network line 315c). After receiving this information (e.g., the event-level data), application server 350 employs application software 360 to perform the inferred attribution analysis and provide reports based on that analysis. Throughout this process, transition tables holding resultant data used for providing the reports are generated and stored in database 370. Client 320 may view and interact with the generated report through client 320's web browser (not shown).

Network link 315 may include telephone lines, digital subscriber line ("DSL"), cable networks, T1 or T3 lines, wireless network connections, or any other arrangement that provides a medium for the transmission and reception of computer network signals. Computer network 310 may include a wide-area network ("WAN"), such as the Internet, and a local-area network ("LAN"), such as an intranet or extranet. It should be noted that, technically, user computing device 200, network link 315, web server 330, application server 350 and any intermediate network components, such as Internet service providers and routers (not shown), are also part of computer network 310 because of their connectivity.

Computer network 310 may implement any number of communications protocols, including TCP/IP ("Transmission Control Protocol/Internet Protocol"). The communication between user computing device ("UCD") 200, web server 330 and application server 350 may be secured by any Internet security protocol, such as SSL ("Secured Sockets Layer").

Web server 330 and application server 350 each include a processor and memory for executing program instructions, as well as a network interface (not shown), and may include a collection of servers working in tandem to distribute the network functionality and load. In one particular embodiment, application server 320 may include a combination of enterprise servers such as a web application server, a web user interface server and a database server, all of which could be manufactured by Sun Microsystems, Inc. The web server (of analytics system 340 as well as web server 330) could run an HTTP server program in one embodiment, such as Apache®, as a process under an operating system such as UNIX® (or any variant thereof). Database 370 may be part of a relational database program, such as MySQL® or Oracle®, that may be run as a process by a database server within the UNIX® operating system, for example.

Application software 330 may take the form of custom-written programs and libraries that run, either interpreted or compiled, in part as a result of HTTP requests received by application server 320. These programs may be written in any programming language, such as C, C++, or PERL ("Practical Extraction and Reporting Language"), and they may generate an HTML ("Hypertext Markup Language") client interface of analytics system 340. Application software 360 may be built on a web-based enterprise application platform, such as J2EE® ("Java 2 Platform, Enterprise Edition").

Tagging

In one example embodiment of the present invention, Web server 330 tracks and sends customer 300's online activity to application server 350 through the use of IMG tags ("event tags") placed on certain pages of client 320's website. The IMG tag is an HTML image request for a 1×1 pixel GIF from application server 350, and includes key-value pairs that are used to pass the event-level data to application server 350.

For example, each event tag may include key-value pairs to capture data about such events as identification of the client site hosting the visitor, the web pages that the visitors (e.g., customer 300) view, the web pages where the visitors place products in their shopping carts, and where the visitors came from before they viewed a tagged web page. The following is an example such an event tag (with key-value pairs highlighted in bold):

<img src='http://client.rpts.net/activity;src=12; ord=12121212?;pg nm=Home+Page;sect=Home+Page;pgurl=http://www-.client.com/Default.a sp?;ref=http://search.yahoo.com/bin/search?p=client.com'>

(Note that, for readability purposes, the above example code has left out URL encoding that may be applied to non-alphanumeric characters in a working embodiment.) In the above tag, "src" is the key for the client site ID (with value "12"), "ord" is the key for a random number used to defeat inadvertent duplicate page loads (with value "12121212"), "pgnm" is the key for the name of the current web page, provided by client 320 (with value "Home+Page"), "sect" is the key for the name of the website section to which the current web page belongs, also provided by client 320 (with value "Home+Page"), "pgurl" is the key for the URL of the current web page (having value "http://www.client.com/Default.asp?"), and "ref" is the key for the referring URL of the current web page (with value "http://search.yahoo.com/bin/search?p=client.com").

Of course, additional data may be supplied using additional keys. Other key-value pairs may be utilized to provide information about a product clicked on by a visitor (via a product identifier value), a product placed into a shopping cart, a product converted (i.e., purchased after being placed in a shopping cart), visitor segment membership and custom information. Client 320 may upload a product information file (e.g., including product identifier, name and category) to application server 350 so that application software 360 can match a product identifier in the IMG tag with the actual product information for reporting purposes.

Inferred Attribution Methodology

The event information automatically sent to application server 350 from web server 330 through the event tag functionality (i.e., the event-level data) may be collected in a log file by application server 350. When the time arrives to analyze the event-level data (e.g., once a day), application software 360 first sorts the events from the log file of the event-level data by visitor and time received by analytics system 340 (step 100). This sort causes all events associated with each visitor during each visitor's session to be listed in chronological order, grouped by visitor. A visitor's session may be defined as any sequence of events that occur within a certain time (e.g., 30 minutes) of one another, and ending after a completed purchase. Further, application software 360 may rely on its own "cookie" information, passed to application server 350 from each visitor's web browser 250 during an event tag request, in order to determine which events have originated from the same visitor (assuming, of course, that the visitor has not opted out of client 320's analytics system 340 cookie, is not behind a proxy server which automatically blocks cookies, or has not disabled receiving cookies via the browser's settings).

According to an example embodiment of the present invention, any one or more of the following five metrics may be attributed by analytics system 340:

1. Clicks—the number of times a hyperlink is clicked on a given page
2. Page Views—the number of page loads of any individual page (product detail page or section page) or a given section
3. Product Cartings—the number of units of a given product that is added to a visitor shopping cart irrespective of the eventual purchase of that product
4. Product Purchases—the number of units of a given product that is purchased
5. Revenue—the total revenue for the product purchases The following table specifies which of the above-referenced example metrics are useful to one or more example navigation entities:

| | Metric | | | | |
|---|---|---|---|---|---|
| Navigation Entity | Clicks | Page Views | Product cartings | Product purchases | Revenue |
| Product Detail Pages | No | Yes | Yes | Yes | Yes |
| Section Pages | No | Yes | Yes | Yes | Yes |
| Sections | No | Yes | Yes | Yes | Yes |
| Traffic-driving hyperlinks | Yes | No | Yes | Yes | Yes |
| Product hyperlinks | Yes | No | Yes | Yes | Yes |

The following defines three navigation entities according to an inferred attribution methodology (step 120):

Pages—standard content delivered into one individual web browser window. The two types of pages may be:

Product Detail Pages—pages that have detailed product information, and may be identified by the presence of a "prodinfo=######" key-value pair in an event tag. Since product detail pages have no pre-defined section membership, analytics system 340 will attribute activity from the product detail page to the section of the last section page seen by the visitor before the product detail page.

Section Pages—pages that do not have detailed product information for one product alone, and may be all pages that do not have a "prodinfo" key-value pair in the event tag (including a shopping cart page).

Sections—a collection of any combination of pages (either section pages or product detail pages). Again, product detail pages have no pre-defined section membership, but analytics system 340 will attribute activity from the product detail page to the section of the last section page seen by the visitor before the product detail page.

Hyperlinks—are standard, clickable text or images (including pictures and buttons) that bring the website visitor to another distinct page within the website.

Traffic-driving hyperlinks—hyperlinks that take the visitor from any page to a section page. These can be thought of as signs in a physical retail store that tell customers where to go to find other similar or different types of products or other information.

Figure 4:
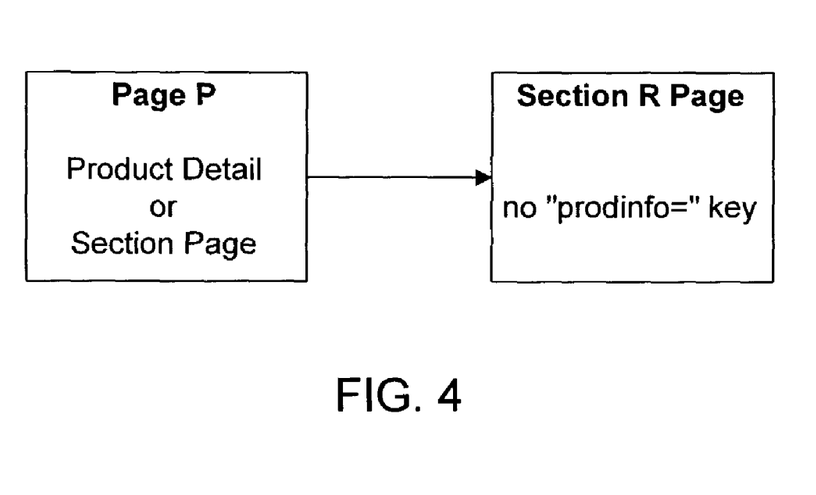
FIG. 4 is a block diagram that depicts a traffic-driving hyperlink in accordance with an embodiment of the present invention.

Example: As shown in FIG. 4, presuming that a visitor starts on Page P (which can be a section page or product detail page), analytics system 340 assumes that a traffic-driving hyperlink exists on Page P which is the last page seen before a section page in a sequence of pages for a given cookie within a given session.

Product hyperlinks—hyperlinks that take the visitor from any page to a product detail page. These can be thought of as the action of taking a product off the shelf (section page) and looking at it.

Figure 5:
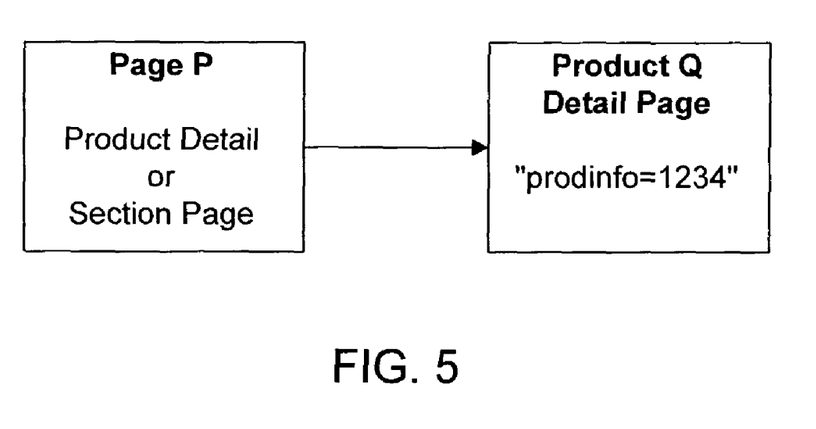
FIG. 5 is a block diagram that depicts a product hyperlink in accordance with an embodiment of the present invention.

Example: As shown in FIG. 5, presuming that a visitor starts on Page P (which can be a section page or product detail page), analytics system 340 assumes that a product hyperlink exists on Page P which is the last page seen before a product detail page in sequence of pages for a given cookie within a given session.

Figure 6:
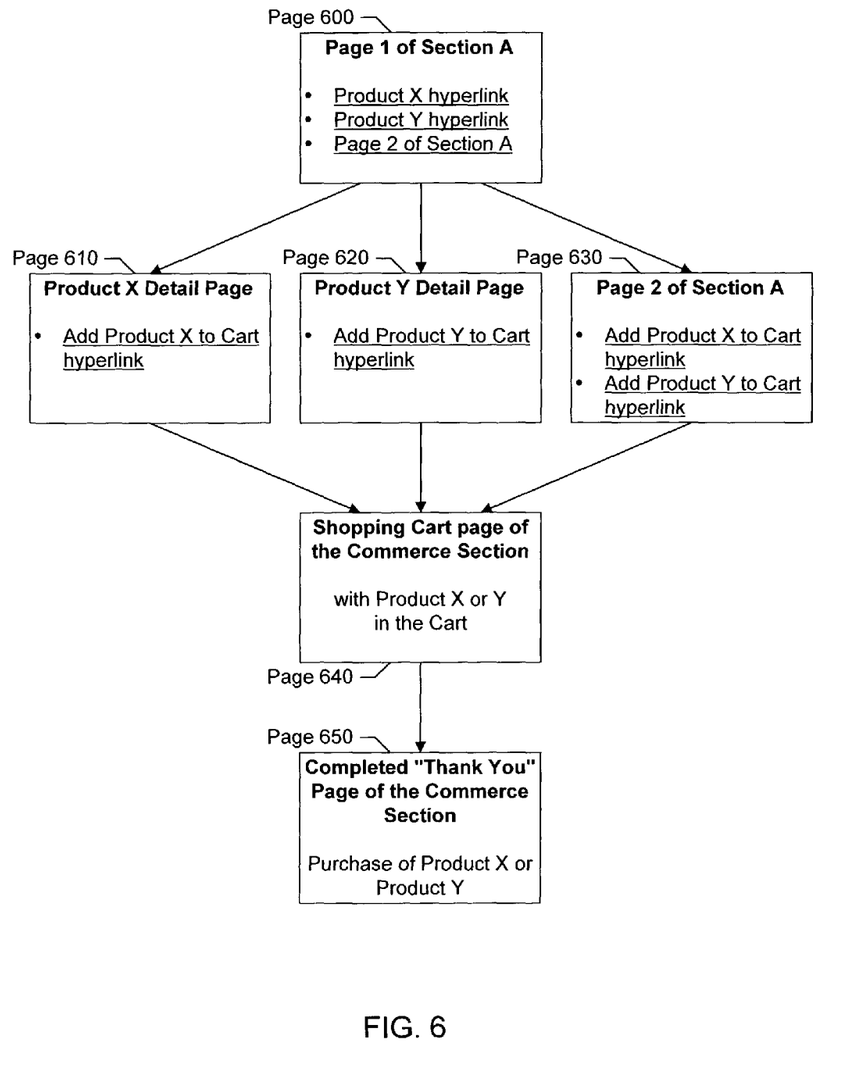
FIG. 6 is a block diagram that depicts generic navigation entities in accordance with an embodiment of the present invention.

Since an inferred attribution methodology is a complex method of attributing metrics to the navigation entities, the following tables show the attribution with a simple and defined example which can be generalized to any website. As shown in FIG. 6, consider the following website for which:

There are only 6 uniquely distinct pages

There are only 2 products on sale (Product X and Product Y)

There are only 2 sections on the site (Section A and Commerce Section)

Product X costs $1 and Product Y costs $5

The arrows indicate the only navigation flow possible

The visitor can leave the website off of any of the 6 pages

Note that any event is attributable to at least one navigation entity and the sum of all navigation entities may be more than the total number of the occurrences of that event on the website.

According to the following visitor's navigation path:

| Page | Visitor Action Taken on the Page |
|---|---|
| 600 | Click on "Product X hyperlink" |
| 610 | Click on "Add Product X to Cart hyperlink" |
| 640 | Visitor confirm purchase of Product X and submits all relevant billing and shipping information |
| 650 | No action taken |

The following attribution may be inferred:

| | | Metric | | | |
|---|---|---|---|---|---|
| Navigation Entity | Clicks | Page Views | Product cartings | Product purchases | Revenue |
| Product Detail Pages | No | | | | |
| Product X Detail Page | | 1 | 0 | 0 | $0 |
| Product Y Detail Page | | 0 | 0 | 0 | $0 |
| Section Pages | No | | | | |
| Section A: Page 1 | | 1 | 1 Prod X | 1 Prod X | $1 |
| Section A: Page 2 | | 0 | 0 | 0 | $0 |
| Commerce: Shopping Cart page | | 1 | 0 | 0 | $0 |
| Commerce: "Thank You" page | | 1 | 0 | 0 | $0 |
| Sections | No | | | | |
| Section A | | 2 | 1 Prod X | 1 Prod X | $1 |
| Commerce Section | | 2 | 0 | 0 | $0 |
| Traffic-driving hyperlinks | No | | | | |
| 600: Page 2 of Section A | 0 | | 0 | 0 | $0 |
| 610: Add Product X to Cart | 0 | | 0 | 0 | $0 |
| 620: Add Product Y to Cart | 0 | | 0 | 0 | $0 |
| 630: Add Product X to Cart | 0 | | 0 | 0 | $0 |
| 630: Add Product Y to Cart | 0 | | 0 | 0 | $0 |
| Product hyperlinks | No | | | | |
| 600: Product X | 1 | | 1 | 1 | $1 |
| 600: Product Y | 0 | | 0 | 0 | $0 |
| 630: Product X (implicit) | 0 | | 0 | 0 | $0 |
| 630: Product Y (implicit) | 0 | | 0 | 0 | $0 |

According to the following visitor's navigation path:

| Page | Visitor Action Taken on the Page |
|---|---|
| 600 | Click on "Product Y hyperlink" |
| 620 | Click on "Add Product Y to Cart hyperlink" |
| 640 | Visitor confirm purchase of Product Y and submits all relevant billing and shipping information |
| 650 | No action taken | the following attribution may be inferred:

| | | Metric | | | |
|---|---|---|---|---|---|
| Navigation Entity | Clicks | Page Views | Product cartings | Product purchases | Revenue |
| Product Detail Pages | No | | | | |
| Product X Detail Page | | 0 | 0 | 0 | $0 |
| Product Y Detail Page | | 1 | 0 | 0 | $0 |
| Section Pages | No | | | | |
| Section A: Page 1 | | 1 | 1 Prod Y | 1 Prod Y | $5 |
| Section A: Page 2 | | 0 | 0 | 0 | $0 |
| Commerce: Shopping Cart page | | 1 | 0 | 0 | $0 |
| Commerce: "Thank You" page | | 1 | 0 | 0 | $0 |
| Sections | No | | | | |
| Section A | | 2 | 1 Prod Y | 1 Prod Y | $5 |
| Commerce Section | | 2 | 0 | 0 | $0 |
| Traffic-driving hyperlinks | No | | | | |
| 600: Page 2 of Section A | 0 | | 0 | 0 | $0 |
| 610: Add Product X to Cart | 0 | | 0 | 0 | $0 |

-continued

| Navigation Entity | Metric | | | | |
|---|---|---|---|---|---|
| | Clicks | Page Views | Product cartings | Product purchases | Revenue |
| 620: Add Product Y to Cart | 0 | | 0 | 0 | $0 |
| 630: Add Product X to Cart | 0 | | 0 | 0 | $0 |
| 630: Add Product Y to Cart | 0 | | 0 | 0 | $0 |
| Product hyperlinks | | No | | | |
| 600: Product X | 0 | | 0 | 0 | $0 |
| 600: Product Y | 1 | | 1 | 1 | $5 |
| 630: Product X (implicit) | 0 | | 0 | 0 | $0 |
| 630: Product Y (implicit) | 0 | | 0 | 0 | $0 |

According to the following visitor's navigation path:

| Page | Visitor Action Taken on the Page |
|---|---|
| 600 | Click on "Page 2 of Section A" hyperlink |
| 630 | Click on "Add Product X to Cart hyperlink" |
| 640 | Visitor confirm purchase of Product X and submits all relevant billing and shipping information |
| 650 | No action taken | the following attribution may be inferred:

| Navigation Entity | Metric | | | | |
|---|---|---|---|---|---|
| | Clicks | Page Views | Product cartings | Product purchases | Revenue |
| Product Detail Pages | No | | | | |
| Product X Detail Page | | 0 | 0 | 0 | $0 |
| Product Y Detail Page | | 0 | 0 | 0 | $0 |
| Section Pages | No | | | | |
| Section A: Page 1 | 1 | | 0 | 0 | $0 |
| Section A: Page 2 | 1 | | 1 Prod X | 1 Prod X | $1 |
| Commerce: Shopping Cart page | 1 | | 0 | 0 | $0 |
| Commerce: "Thank You" page | | 1 | 0 | 0 | $0 |
| Sections | No | | | | |
| Section A | 2 | | 1 Prod X | 1 Prod X | $1 |
| Commerce Section | 2 | | 0 | 0 | $0 |
| Traffic-driving hyperlinks | | No | | | |
| 600: Page 2 of Section A | 1 | | 1 Prod X | 1 Prod X | $1 |
| 610: Add Product X to Cart | 0 | | 0 | 0 | $0 |
| 620: Add Product Y to Cart | 0 | | 0 | 0 | $0 |
| 630: Add Product X to Cart | 0 | | 0 | 0 | $0 |
| 630: Add Product Y to Cart | 0 | | 0 | 0 | $0 |
| Product hyperlinks | | No | | | |
| 600: Product X | 0 | | 0 | 0 | $0 |
| 600: Product Y | 0 | | 1 | 1 | $1 |
| 630: Product X (implicit) | 0 | | 1 | 1 | $1 |
| 630: Product Y (implicit) | 0 | | 0 | 0 | $0 |

According to the following visitor's navigation path:

| Page | Visitor Action Taken on the Page |
|---|---|
| 600 | Click on "Page 2 of Section A" hyperlink |
| 630 | Click on "Add Product Y to Cart hyperlink" |
| 640 | Visitor confirm purchase of Product Y and submits all relevant billing and shipping information |
| 650 | No action taken | the following attribution may be inferred:

| Navigation Entity | Metric | | | | |
|---|---|---|---|---|---|
| | Clicks | Page Views | Product cartings | Product purchases | Revenue |
| Product Detail Pages | No | | | | |
| Product X Detail Page | | 0 | 0 | 0 | $0 |
| Product Y Detail Page | | 0 | 0 | 0 | $0 |
| Section Pages | No | | | | |
| Section A: Page 1 | 1 | | 0 | 0 | $0 |
| Section A: Page 2 | 1 | | 1 Prod Y | 1 Prod Y | $5 |
| Commerce: Shopping Cart page | 1 | | 0 | 0 | $0 |
| Commerce: "Thank You" page | 1 | | 0 | 0 | $0 |
| Sections | No | | | | |
| Section A | 2 | | 1 Prod Y | 1 Prod Y | $5 |
| Commerce Section | 2 | | 0 | 0 | $0 |
| Traffic-driving hyperlinks | | No | | | |
| 600: Page 2 of Section A | 1 | | 1 Prod Y | 1 Prod Y | $5 |
| 610: Add Product X to Cart | 0 | | 0 | 0 | $0 |
| 620: Add Product Y to Cart | 0 | | 0 | 0 | $0 |
| 630: Add Product X to Cart | 0 | | 0 | 0 | $0 |
| 630: Add Product Y to Cart | 0 | | 0 | 0 | $0 |
| Product hyperlinks | | No | | | |
| 600: Product X | 0 | | 0 | 0 | $0 |
| 600: Product Y | 0 | | 0 | 0 | $0 |
| 630: Product X (implicit) | 0 | | 0 | 0 | $0 |
| 630: Product Y (implicit) | 0 | | 1 | 1 | $5 |

Page Pairing Implementation

Once attribution is inferred based on the visitor activity determined from the event level data, analytics system 340 generates resultant data for providing client reports via a page pairing implementation (step 120), according to an example embodiment of the present invention.

For each visitor session in the event level data, every page-by-page navigation is broken down. For example, assume the following path for one visit by a visitor on the client's website, which only has one product for sale for $1 each:

Page A>Page B>Page C>Page D>Page B>Page C>Page D>Page A>Purchased all products in Shopping Cart Also, for simplicity, assume that all of these pages are section pages (which, as mentioned above, may include a shopping cart page), since a product detail page would cause the carting attribution to go back further than one page from an "add-to-cart" event.

In order to create a processed transition table to be used for providing client reports, a raw transition table is first created that holds the 5 transitions (i.e., pairings of sequentially viewed pages):

Raw transition table

| Transition # | "From" page | "To" Page |
|---|---|---|
| 1 | Page A | Page B |
| 2 | Page B | Page C |
| 3 | Page C | Page D |
| 4 | Page D | Page B |
| 5 | Page B | Page C |
| 6 | Page C | Page D |
| 7 | Page D | Page A |

Any of these transitions can have an event associated with it that is captured on the "to" page. These events can be "add-to-cart" events or a purchase event indicating that a product of a given quantity and total price is associated.

Raw transition table with event association and Result

| Transition # | "From" page | "To" Page | Event | Product on sale | Result |
|---|---|---|---|---|---|
| 1 | Page A | Page B | Add 1 product to cart | Yes | Purchased product |
| 2 | Page B | Page C | Nothing | No | None |
| 3 | Page C | Page D | Nothing | No | None |
| 4 | Page D | Page B | Add 1 product to cart | Yes | Purchased product |
| 5 | Page B | Page C | Nothing | No | None |
| 6 | Page C | Page D | Add 1 product to cart | Yes | Purchased product |
| 7 | Page D | Page A | Nothing | No | None |

The implication of each "add-to-cart" event based on the inferred attribution methodology is to say that the "from" page in an "add-to-cart" transition page is the page where the product is on sale. Note that the inferred attribution process may take place during or before the page pairing implementation.

Extra processing may then be performed on this table to include all of the attribution and extra data associated with the smallest overall number of transitions:

Processed transition table

| "From" page | "To" Page | # non-unique session transitions | # unique session transitions | Product on Sale | Result |
|---|---|---|---|---|---|
| Page A | Page B | 1 | 1 | Yes | Product purchased for $1 |
| Page B | Page C | 2 | 1 | No | None |
| Page C | Page D | 2 | 1 | Yes | Product purchased for $1 |
| Page D | Page B | 1 | 1 | Yes | Product purchased for $1 |
| Page D | Page A | 1 | 1 | No | None |

The processed transition table may be stored in database 370, and the following reports may use information from this table to provide client reports (step 130).

In order to generate a report that displays the visitor's navigation path through a specified page of the client's website, the following relevant data from the processed transition table is used:

| "From" page | "To" Page | # unique session transitions |
|---|---|---|
| Page A | Page B | 1 |
| Page B | Page C | 1 |
| Page C | Page D | 1 |
| Page D | Page B | 1 |
| Page D | Page A | 1 |

Note since two transitions (Page B to Page C and from page C to Page D) happen twice in the same session, it is only counted once for this particular report.

To create this the left hand side of this report, the "to" page is filtered for Page B only and the following is extracted from the "from" pages. The results are as follows:

| "From" page | "To" Page | # unique session transitions |
|---|---|---|
| Page A | Page B | 1 |
| Page D | Page B | 1 |

To create the right hand side of this report, the "from" page is filtered by Page B only and the following is extracted from the "to" pages. The results are as follows:

| "From" page | "To" Page | # unique session transitions |
|---|---|---|
| Page B | Page C | 1 |

The output for the visitor's navigation path report is as follows:

| "From" Page | # sessions | "To" page | # sessions |
|---|---|---|---|
| Page A | 1 | Page B Page C | 1 |
| Page D | 1 | | |

Figure 7:
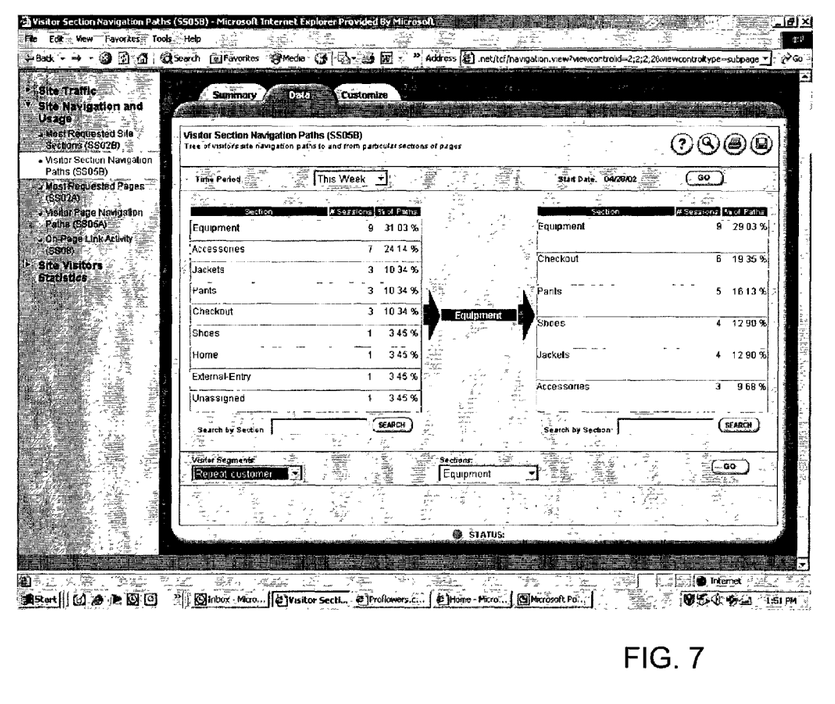
FIG. 7 is a screen shot of a Visitor Section Navigation Paths analysis page in accordance with an embodiment of the present invention.

FIG. 7 shows a navigation path report using data representing more than one visitor and session.

In order to generate a report that displays the visitor's shopping activity generated by links clicked at least once on a specified web page (i.e., page link performance), the following relevant data from the processed transition table is used:

| "From" page | "To" Page | # non-unique session transitions | Product on Sale | Result |
|---|---|---|---|---|
| Page A | Page B | 1 | Yes | Product purchased for $1 |
| Page B | Page C | 2 | No | None |
| Page C | Page D | 2 | Yes | Product purchased for $1 |
| Page D | Page B | 1 | Yes | Product purchased for $1 |
| Page D | Page A | 1 | No | None |

To generate this report, the "from" page is held constant to determine what has happened from this page. Filtering for "from" pages for Page D and all of the locations where the hyperlinks take the individual, the resulting data is extracted:

| "From" page | "To" Page | # non-unique session transitions | Product on Sale | Result |
|---|---|---|---|---|
| Page D | Page B | 1 | Yes | Product purchased for $1 |
| Page D | Page A | 1 | No | None |
| Page A | Page B | 1 | Yes | Product purchased for $1 |
| Page B | Page C | 2 | No | None |

"From" Page A has revenue associated with it, therefore the "traffic-driving" link to Page A has 1 carted item, 1 purchased item and Revenue. Since the "from" Page B has no attributable metrics to it, there is no change in the metrics.

The output for the page link performance report is as follows:

| Link Type | Item | Clicks | Carted Items | Purchased Items | Revenue |
|---|---|---|---|---|---|
| Product | Product | 0 | 1 | 1 | $1 |
| Traffic-driving | Page A | 1 | 1 | 1 | $1 |

Note that if:
there were any product detail pages for the product that had a hyperlink to that page from Page D, those product detail page loads would be counted as "Clicks" in this table
there were no purchases made from Page A, the number of Cart Items, Purchased Items and Revenue would all be zero in value FIG. 8 shows a page link performance report using data representing more than one visitor and session.

In order to generate a report that displays all of the web pages where a specified product is displayed (i.e., product placement), the following relevant data from the processed transition table is used:

| "From" page | # non-unique session transitions | Result |
|---|---|---|
| Page A | 1 | Product purchased for $1 |
| Page B | 2 | None |
| Page C | 2 | Product purchased for $1 |
| Page D | 1 | Product purchased for $1 |
| Page D | 1 | None |

To generate this report, filter all "from" pages by whether a product was purchased from that page and sum across all "From" pages:

| "From" page | # non-unique session transitions | Result |
|---|---|---|
| Page A | 1 | Product purchased for $1 |
| Page C | 2 | Product purchased for $1 |
| Page D | 1 | Product purchased for $1 |

The output for the product placement report is as follows:

| Page | Page Views | Purchase Items | Revenue |
|---|---|---|---|
| Page A | 1 | 1 | $1 |
| Page C | 2 | 1 | $1 |
| Page D | 1 | 1 | $1 |

Note that there are no "click" counts in this table—just the number of times the "from" page has been loaded.

Figure 9:
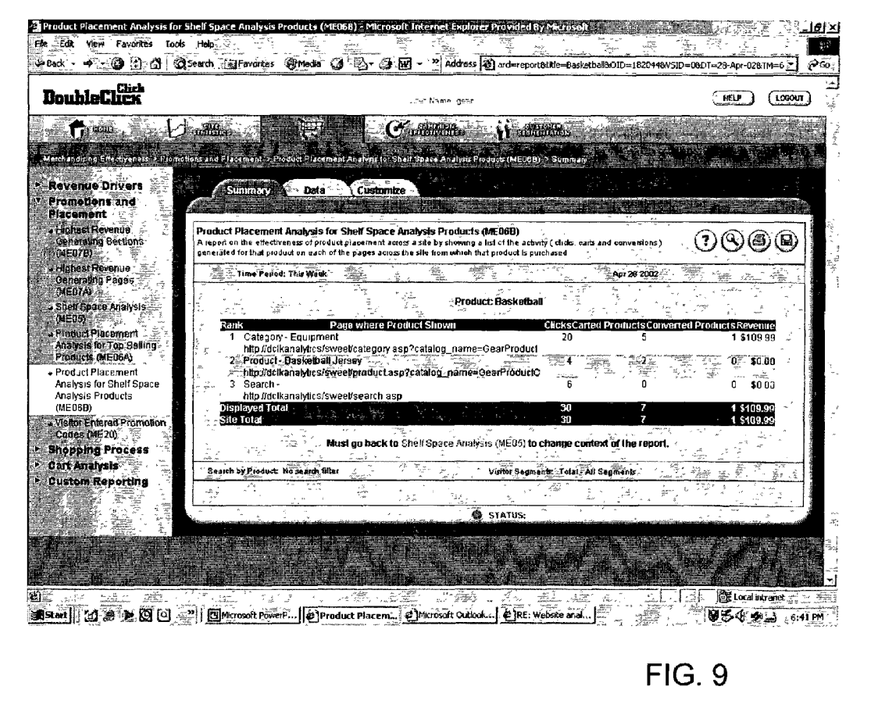
FIG. 9 is a screen shot of a Product Placement Analysis page in accordance with an embodiment of the present invention.

FIG. 9 shows a product placement report using data representing more than one visitor and session.

Several embodiments of the invention are specifically illustrated and/or described herein. However, it will be appreciated that modifications and variations of the invention are covered by the above teachings and within the purview of the appended claims without departing from the spirit and intended scope of the invention.

For example, embodiments of the invention can be applied to non-merchandising websites by capturing the metrics mapped to the navigation entities. Publishers interested in determining which ad space is valuable can use such metrics as ad exposures, advertiser hyperlink clicks, and website registration. Non-publishers interested in determining what applications and documents are accessed can use such metrics as application and documentation downloads.

Also, this invention can be applied to multiple client websites with distinct URLs by collating their respective data under one client as recognized by the system. By defining either individual sections for each distinct URL as a separate section or by defining the entire website entities as separate sections, the inferred attribution of metrics would apply in a similar fashion as applied by the single client website embodiment described herein.

Additionally, with a number of clients with similar application of the system (e.g., selling furniture online, newspaper publishing website, etc.), reports can be provided to compare one client's metrics against an anonymous pool of other clients to determine its relative standing in the industry on several metrics.

What is claimed is:
1. A method for reporting website activity, comprising:
receiving event-level data representing visitor activity through navigation entities on a client website;

inferring attribution of one or more metrics to at least one navigation entity based on the visitor activity and not based on explicit attribution information from the event-level data associated with the at least one navigation entity; and providing online reports to the client based on the inferred attribution.

2. The method of claim 1, wherein the one or more metrics are applied to the at least one navigation entity based on the event-level data associated with another navigation entity in a navigation path of the visitor at the client website.

3. An apparatus for reporting website activity, comprising:
a processor; and
a memory, coupled to the processor, storing instructions adapted to be executed by the processor to:
receive event-level data representing visitor activity through navigation entities on a client website;
infer attribution of one or more metrics to at least one navigation entity based on the visitor activity and not based on explicit attribution information from the event-level data associated with the at least one navigation entity; and
provide online reports to the client based on the inferred attribution.

4. The apparatus of claim 3, wherein the one or more metrics are applied to the at least one navigation entity based on the event-level data associated with another navigation entity in a navigation path of the visitor at the client website.

5. A method for reporting website activity, comprising:
receiving event-level data associated with a visitor's navigation path through navigation entities on a website;
applying one or more metrics to at least one of the navigation entities based on the event-level data associated with another of the navigation entities in the visitor's navigation path; and
generating reports based on the application of the one or more metrics.

6. The method of claim 5, wherein the at least one of the navigation entities precedes the another of the navigation entities in the visitor's navigation path.

7. The method of claim 6, wherein the navigation entities include web pages provided by the website.

8. The method of claim 7, wherein:
the another of the navigation entities in the visitor's navigation path includes a product detail page provided by the website, and
the at least one of the navigation entities includes a section page provided by the website.

9. The method of claim 7, wherein the one or more metrics include whether a particular type of hyperlink is provided.

10. The method of claim 9, wherein the particular type of hyperlink includes a traffic-driving hyperlink.

11. The method of claim 10, wherein the traffic-driving hyperlink takes the visitor from any page provided by the web site to a section page provided by the web site.

12. The method of claim 9, wherein the particular type of hyperlink includes a product hyperlink.

13. The method of claim 12, wherein the product hyperlink takes the visitor from any page provided by the web site to a product detail page provided by the web site.

14. The method of claim 7, wherein the one or more metrics includes whether a product is on sale.

15. The method of claim 5, wherein the navigation entities include one or more of the group consisting of a product detail page, a section page, a section, a traffic-driving hyperlink, and a product hyperlink.

16. The method of claim 5, wherein the one or more metrics include one or more of the group consisting of a click, page view, a product carting, a product purchase, and revenue.

17. The method of claim 5, wherein the generated reports are provided online.

18. The method of claim 5, further comprising:
pairing web pages from the visitor's navigation path in connection with one or more events identified from the event-level data.

* * * * *